United States Patent
Feng et al.

(10) Patent No.: US 10,417,524 B2
(45) Date of Patent: Sep. 17, 2019

(54) DEEP ACTIVE LEARNING METHOD FOR CIVIL INFRASTRUCTURE DEFECT DETECTION

(71) Applicant: Mitsubishi Electric Research Laboratories, Inc., Cambridge, MA (US)

(72) Inventors: Chen Feng, Cambridge, MA (US); Ming-Yu Liu, San Jose, CA (US); Chieh-Chi Kao, Goleta, CA (US); Teng-Yok Lee, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/646,563

(22) Filed: Jul. 11, 2017

(65) Prior Publication Data

US 2018/0232601 A1    Aug. 16, 2018

Related U.S. Application Data

(60) Provisional application No. 62/459,834, filed on Feb. 16, 2017.

(51) Int. Cl.
*G06K 9/62* (2006.01)
*G06T 7/00* (2017.01)
(Continued)

(52) U.S. Cl.
CPC ......... *G06K 9/6231* (2013.01); *G06K 9/4628* (2013.01); *G06K 9/628* (2013.01);
(Continued)

(58) Field of Classification Search
CPC .. G06K 9/6231; G06K 9/4628; G06K 9/6262; G06K 9/6255; G06K 9/6259;
(Continued)

(56) References Cited

U.S. PATENT DOCUMENTS 8,086,549 B2    12/2011    Qi et al.
8,140,450 B2    3/2012    Porikli et al.
(Continued)

FOREIGN PATENT DOCUMENTS

| CN | 104535615 | 4/2015 |
|---|---|---|
| CN | 105651684 | 6/2016 |
| DE | 102006027132 | 4/2010 |

OTHER PUBLICATIONS

Chunjiang et al., "Actively Learning from Mistakes in Class Imbalance Problems," Proceedings of the 17th World Congress the International Federation of Automatic Control; Seol, Korea; Jul. 6-11, 2008. vol. 46, No. 13, pp. 341-346.

(Continued)

*Primary Examiner* — Ming Y Hon
(74) *Attorney, Agent, or Firm* — Gennadiy Vinokur; James McAleenan; Hironori Tsukamoto

(57) ABSTRACT

An image processing system includes a memory to store a classifier and a set of labeled images for training the classifier, wherein each labeled image is labeled as either a positive image that includes an object of a specific type or a negative image that does not include the object of the specific type, wherein the set of labeled images has a first ratio of the positive images to the negative images. The system includes an input interface to receive a set of input images, a processor to determine a second ratio of the positive images, to classify the input images into positive and negative images to produce a set of classified images, and to select a subset of the classified images having the second ratio of the positive images to the negative images, and an output interface to render the subset of the input images for labeling.

18 Claims, 12 Drawing Sheets

(51) Int. Cl.
*G06N 3/08* (2006.01)
*G06K 9/46* (2006.01)

(52) U.S. Cl.
CPC ......... *G06K 9/6255* (2013.01); *G06K 9/6259* (2013.01); *G06K 9/6262* (2013.01); *G06K 9/6263* (2013.01); *G06N 3/08* (2013.01); *G06T 7/001* (2013.01); *G06T 7/0004* (2013.01); *G06T 2200/28* (2013.01); *G06T 2207/10028* (2013.01); *G06T 2207/20081* (2013.01); *G06T 2207/20084* (2013.01); *G06T 2207/20092* (2013.01); *G06T 2207/30108* (2013.01); *G06T 2207/30132* (2013.01)

(58) Field of Classification Search
CPC ........ G06K 9/628; G06K 9/6263; G06N 3/08; G06T 7/001; G06T 2207/30108; G06T 2200/28; G06T 2207/20092; G06T 2207/20081; G06T 2207/10028; G06T 2207/20084
See application file for complete search history.

(56) References Cited

U.S. PATENT DOCUMENTS

| | | | |
|---|---|---|---|
| 8,873,837 B2 | 10/2014 | Jahanshahi et al. | |
| 9,141,883 B1* | 9/2015 | Nam | G06K 9/6284 |
| 9,235,902 B2 | 1/2016 | Jahanshahi et al. | |
| 2007/0098254 A1* | 5/2007 | Yang | G06K 9/00369 |
| | | | 382/159 |
| 2010/0021066 A1* | 1/2010 | Sabe | G06K 9/00221 |
| | | | 382/190 |
| 2011/0176725 A1* | 7/2011 | Homma | G06K 9/6228 |
| | | | 382/159 |
| 2012/0269436 A1* | 10/2012 | Mensink | G06K 9/00624 |
| | | | 382/180 |
| 2016/0275411 A1* | 9/2016 | Kim | G06F 16/24568 |
| 2016/0284075 A1* | 9/2016 | Phan | G06T 7/001 |
| 2017/0011280 A1* | 1/2017 | Soldevila | G06K 9/00362 |
| 2017/0076179 A1* | 3/2017 | Martineau | G06K 9/6269 |
| 2017/0083752 A1* | 3/2017 | Saberian | G06T 3/40 |
| 2018/0107902 A1* | 4/2018 | Yang | G06F 17/30244 |
| 2019/0013014 A1* | 1/2019 | Grancharov | G10L 15/005 |

OTHER PUBLICATIONS

Feng et al., "Deep Active Learning for Civil Infrastructure Defect Detection and Classification," Apr. 3, 2017, pp. 1-10.

Japkowicz., "The Class imbalance problem, Significance and Strategies," 2000. retrieved from the internet: http://citeseerx.ist.psu.edu/viewdoc/download;jsessionid=310206D48F3D74F56C4C16E2756D9AD6?doi=10.1.1.35.1693&rep=rep1&type=pdf. retrieved Apr. 12, 2018.

Akbani et al., "Applying Support Vector Machines to Imbalanced Datasets," ECCV 2016 Conference, 2004, Springer International Publishing, Cham 032548. vol. 3201, pp. 39-50.

Zhang et al., "Road Crack Detection using Deep Convolutional Neural Network," 2016 IEEE International Conference on Image Processing, IEEE, Sep. 25, 2016, pp. 3708-3712.

Soukup et al., "Convolutional Neural Networks for Steel Surface Defect Detection from Photometric Stereo Images," Dec. 8, 2014, ECCV 2016 Conference, Lecture Notes in Computer Science. pp. 668-677.

Jo et al., "Class Imbalances Versus Small Disjuncts," ACM SIGKDD Explorations Newsletter, Association for Computer Machinery, Inc. US. vol. 6, No. 1, Jun. 2004. pp. 40-49.

He et al., "Deep Residual Learning for Image Recognition," 2016 IEEE Conference on Computer Vision and Pattern Recognition, Dec. 10, 2015. pp. 1-12. https://arxiv.org/abs/1512.03385.

Bahjat Safadi, Georges Quénot. Active Learning with Multiple Classifiers for Multimedia Indexing. Multimedia Tools and Applications, Springer Verlag, 2012, 60 (2), pp. 403-417.

* cited by examiner

| Layer name | Output size | Specification of each layer |  |
|---|---|---|---|
| conv0 | 256×256 | 7×7, 16, stride 2 | |
| conv1_x | 128×128 | 2×2 max pool, stride 2 | |
| | | 3×3, 16<br>3×3, 16 | ×2 |
| conv2_x | 64×64 | 3×3, 32<br>3×3, 32 | ×6 |
| conv3_x | 32×32 | 3×3, 64<br>3×3, 64 | ×8 |
| | 1×1 | average pooling, 2-d fc, softmax | |

FIG. 4

DEEP ACTIVE LEARNING METHOD FOR CIVIL INFRASTRUCTURE DEFECT DETECTION

TECHNICAL FIELD

This invention relates generally to a method for detecting defects of civil infrastructure surfaces in an image using artificial neural networks, and more specifically to an active learning method for training artificial neural networks for such tasks.

BACKGROUND

Artificial neural networks (NNs) are revolutionizing the field of computer vision. The top-ranking algorithms in various visual object recognition challenges, including ImageNet, Microsoft COCO, and Pascal VOC, are all based on NNs.

In the visual object recognition using the NNs, the large scale image datasets are used for training the NNs to obtain better performance. However, annotating large-scale image datasets is an expensive and tedious task, requiring people to spend a large amount of time analyzing image content in a dataset because the subset of important images in the unlabeled dataset are selected and labeled by the human annotations.

Active learning is a machine learning procedure that is useful in reducing the amount of annotated data required to achieve a target performance. It has been applied to various computer-vision problems including object classification and activity recognition. The active learning starts by training a baseline model (classifier, such as neural network) with a small, labeled dataset, and then applying the classifier to the unlabeled data. For unlabeled samples, the active learning estimates whether each unlabeled sample contains critical information that has not been learned by the baseline model. Once the unlabeled samples that bring the most critical information are identified and labeled by human annotators, the labeled samples can be added to the initial training dataset to retrain the model. Compared to passive learning, which randomly selects samples from the unlabeled dataset, the active learning can achieve the same accuracies with fewer but more informative labeled samples.

Different active learning methods use different metrics for measuring how informative a sample is for the classification task. Examples of such metrics include the maximum uncertainty, expected model change, density weighted metric, etc. However, those metrics are still suboptimal for some applications. Accordingly, there is a need to develop optimal metrics of the active learning methods for other applications.

SUMMARY

Some embodiments provide a system and a method for image processing suitable for active learning of images that can be used for training a classifier, such as a neural network. Some embodiments are based on recognition that various metrics for measuring informativeness of the image for training some classifier render sub-optimal performance for those classifiers. Examples of such classifiers include a classifier suitable for monitoring civil infrastructure, e.g., detect deposits and/or crack of the surface of the walls, and/or effects of a water leakage.

Some embodiments are based on realization that some metrics indicating informativeness of an image ignore the structure of the content of the training dataset used to train the classifier. However, the images selected for the active learning are used to update that training dataset, and the content of the training dataset can provide an additional clue on what this training data set is lacking.

Specifically, in some situations, images can be classified as positive and negative images. As used herein, each positive image includes an object of a specific type and each negative image does not include the object of the specific type. For example, civil infrastructure defect classifiers often need to classify the images into positive or negative, e.g., does this image include a crack or not, include deposit or not, include water leakage or not. For example, an image that captures a crack on a surface of a wall is a positive image and an image that does not include the crack is a negative image.

However, the training dataset for such classifiers is usually heavily unbalanced with much more negative than positive images. For example, when a robot travels into a tunnel to acquire images of surfaces of walls of the tunnel, out of 1000 images made by the robot, only a handful of images may be positive. In those situations, regardless or in addition to the uncertainty measure used to select the images for active learning, the positive images can be more informative for training the classifier than the negative images.

To that end, some embodiments are based on realization that the selection of the images for the active learning needs to be based on a ratio of the positive images to the negative images in the training dataset. This ratio can be considered alone or in combination with any other uncertainty measures indicative of informativeness of the images in the selection of those images for the active learning.

Accordingly, one embodiment discloses an image processing system that includes a memory to store a classifier and a set of labeled images for training the classifier. Each labeled image is labeled as either a positive image that includes an object of a specific type or a negative image that does not include the object of the specific type, such that the set of labeled images has a first ratio of the positive images to the negative images.

The image processing system also includes an input interface to receive a set of input images, an output interface for labeling the images, and a processor to select the images to be labeled. The processor is configured to determine, based on the first ratio, a second ratio of the positive images to the negative images, to classify, using the classifier, the input images into positive and negative images to produce a set of classified images, to select a subset of the classified images having the second ratio of the positive images to the negative images, and to render the subset of the input images for labeling.

In one embodiment, the output interface is a display device having an interface allowing an operator to label a displayed image as the positive image or the negative image. In this embodiment, the processor renders the subset of the classified images on the display device, adds, in response to labeling the subset of classified images by the operator, the subset of the labeled classified images into the set of labeled images thereby updating the first ratio, and retrains the classifier with the updated set of labeled images.

Another embodiment discloses a method for image processing, wherein the method uses a processor coupled to a memory storing a classifier and a set of labeled images for training the classifier, each labeled image is labeled as either a positive image that includes an object of a specific type or a negative image that does not include the object of the specific type, wherein the set of labeled images has a first ratio of the positive images to the negative images, wherein the processor is coupled with stored instructions implementing the method, wherein the instructions, when executed by the processor carry out at least some steps of the method. The method includes receiving a set of input images; determining, based on the first ratio, a second ratio of the positive images to the negative images; classifying, using the classifier, the input images into positive and negative images to produce a set of classified images; selecting a subset of the classified images having the second ratio of the positive images to the negative images; and rendering the subset of the input images for labeling.

Yet another embodiment discloses a non-transitory computer readable storage medium storing a classifier and a set of labeled images for training the classifier, each labeled image is labeled as either a positive image that includes an object of a specific type or a negative image that does not include the object of the specific type, wherein the set of labeled images has a first ratio of the positive images to the negative image and embodied thereon a program executable by a processor for performing a method. The method includes receiving a set of input images; determining, based on the first ratio, a second ratio of the positive images to the negative images; classifying, using the classifier, the input images into positive and negative images to produce a set of classified images; selecting a subset of the classified images having the second ratio of the positive images to the negative images; and rendering the subset of the input images for labeling.

Different embodiments select different type of mapping between the first and the second ratios. For example, in one embodiment, the second ratio is one minus the first ratio. This embodiment allows to seamlessly adjusting the second ratio when the first ratio is updated. In alternative embodiment, the processor selects only positive images when the training data set is heavily unbalanced. In this embodiment, the second ratio equals 0.5 when the first ratio is greater than a threshold, and the second ratio equals 1 when the first ratio is less than a threshold.

In some embodiments, the classifier is a neural network, e.g., a convolutional neural network. In various embodiments, the neural network is implemented differently. For example, in one embodiment, the neural network is a residual neural network. This embodiment is based on recognition that modeling the non-linear mapping of the input and output images is more difficult than modeling the residuals of such a mapping allowing increasing a number of layers.

In some embodiments, the use of an artificial neural network that determines an uncertainty measure may reduce central processing unit (CPU) usage, power consumption, and/or network bandwidth usage, which is advantageous for improving the functioning of a computer.

BRIEF DESCRIPTION OF THE DRAWINGS

FIG. 4 is an architecture of a neural network for detecting defects, in accordance with some embodiments of the present disclosure;

DETAILED DESCRIPTION OF THE PREFERRED EMBODIMENTS

Figure 1A:
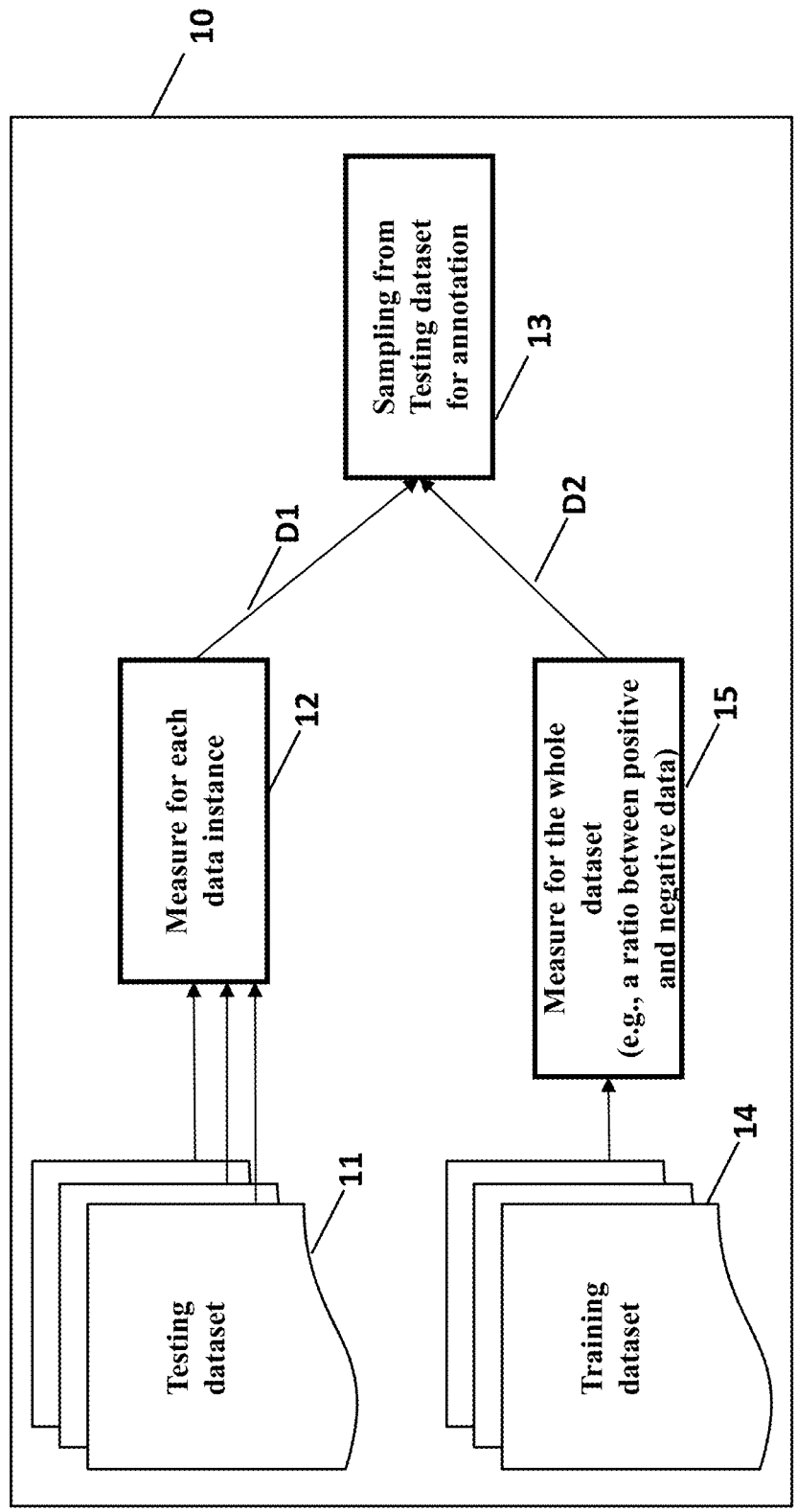
FIG. 1A is a block diagram indicating an active learning systems for training neural networks, in accordance with some embodiments of the present invention.

Some embodiments according to the present disclosure provide an active learning network for labeling images indicating objects of a specific type, e.g. civil infrastructure surfaces with cracks, which can increase the efficiency and performance of automatic defect detection process.

For instance, the active learning network is useful in reducing the amount of annotated data required for accurate object detection and is also less time consuming. Active learning network performs an active learning algorithm that can increase the detection accuracy by adding labeled images over time and retraining the system based on the added data.

The active learning algorithm may start by training a classifier, such as a neural network, with a small, labeled dataset, and then applying the classifier to the unlabeled data. For each unlabeled sample, the active learning algorithm instructs a processor to estimate whether the sample contains critical information that has not been learned by the classifier. Once the sample including the important information identified and labeled by human annotators, the sample can be added to the initial training dataset to retrain the classifier.

Further, embodiments of the present disclosure provide the use of active learning based an uncertainty measure of input images including objects of the specific type (e.g. surface defects) and a ratio of the images including the objects of the specific type in a labeled dataset. The images may be classified as two types. For instance, 1) Positive Images, which contain an object of a specific type, such as a defect, and 2) Negative images, which do not include the object of the specific type. In some cases, a training dataset of images contains more negative images than positive images. To increase the performance of the active learning network, selecting the subset of images having a certain ratio of positive and negative images is useful.

In some embodiments, an active learning system includes a human machine interface; a storage device including neural networks; a memory; a network interface controller connectable with a network being outside the system; an imaging interface connectable with an imaging device; and a processor configured to connect to the human machine interface, the storage device, the memory, the network interface controller and the imaging interface, wherein the processor executes instructions for detecting defects in an image using the neural networks stored in the storage device, wherein the neural networks perform steps of training a neural network with a dataset including positive and negative images; determining an uncertainty measure of an image to include or exclude the defect using the neural network; combining the uncertainty measure with a ratio of the positive or the negative images in the dataset to produce a rank of the image indicative of a necessity of a manual labeling; and adding the labeled image to the dataset thereby updating the ratio and retraining the neural network.

Ratio of different types of training images effect the classification performance. Active learning aims to improve the training efficiency by selecting the most informative images. Typically, the informative images are the images about which the classifier is uncertain. However, the uncertainty of the classifier is effected by the type of the training data, such as a ratio of the different types of training images. To that end, quality of the training data set needs to be considered in selecting the training images.

One requirement for DL to achieve better performance in supervised learning is to have enough labeled data. For example, in tasks of defect detection, it is required to have a large number of images with human experts (annotators or operators) labeling each image as containing a certain type of defect or not. However, in real world infrastructure inspections, labeled data is harder to obtain than unlabeled ones, due to the limited labeling resources. Only well-trained experts would be able to correctly label images of certain types (e.g., water leakage). Moreover, the accumulation of such a large database takes time. Accordingly, there is need to reduce the accumulation time.

To maximize such a pipeline's efficiency and performance under the above concerns, we introduce an active learning strategy to tackle this problem more efficiently. It is based on the observation that sometimes we can be satisfied with a not-so-good system due to lack of training data, as long as we know that when more labeled data come we can improve the system's performance. The question is whether we can use the not-so-good system to help us more efficiently send only difficult and thus more "valuable" images to human experts for labeling, rather than wasting their time labeling easy and less "valuable" images. For example, at an initial phase, we are only given a small set of images with defect labels, resulting in a defect detector with poor precision (slightly better than random guesses). Although performing poorly, this detector can filter out many non-defect images. We can then send the currently most difficult cases (e.g., images that the detector is not certain of its classification result) to human experts for ground truth labels, and thus most aggressively improve the system's performance.

Some embodiments of the invention are based on recognition that neural networks trained with labeled images provide better defect detection and classification accuracy in images of civil infrastructure surfaces; and that an active learning using an uncertainty measure of input images to include surface defects and a ratio of the images including surface detects in a labeled dataset provides less annotation processes with improving the accuracy of such defect detection and classifications.

Accordingly, one embodiment discloses a method for training a neural network using a processor in communication with a memory, and the method includes training a neural network with a dataset including positive and negative images, wherein the positive images are labeled to include a defect of a surface, and wherein the negative images are labeled to not include the defect of the surface; determining an uncertainty measure of an image to include or exclude the defect using the neural network; combining the uncertainty measure with a ratio of the positive or the negative images in the dataset to produce a rank of the image indicative of a necessity of a manual labeling; and adding the labeled image to the dataset thereby updating the ratio and retraining the neural network, wherein steps of the method are performed by a processor.

Accordingly, one embodiment discloses a non-transitory computer-readable medium storing software comprising instructions executable by one or more computers which, upon such execution, cause the one or more computers to perform operations. The operation includes training a neural network with a dataset including positive and negative images; determining an uncertainty measure of an image to include or exclude the defect using the neural network; combining the uncertainty measure with a ratio of the positive or the negative images in the dataset to produce a rank of the image indicative of a necessity of a manual labeling; and adding the labeled image to the dataset thereby updating the ratio and retraining the neural network.

FIG. 1A is a block diagram illustrating a sampling process of an active learning system 10, according to embodiments of the present invention. The active learning system 10 samples new unlabeled data D1 for annotation from a testing dataset 11 based on some measure 12 computed on each data instance in a process 13. In addition, the active learning system 10 also samples other new unlabeled data D2 based on some other measure 15 over the whole training dataset 14 in the process 13, which is used to train a classifier that produces the measure for each data instance.

Figure 1B:
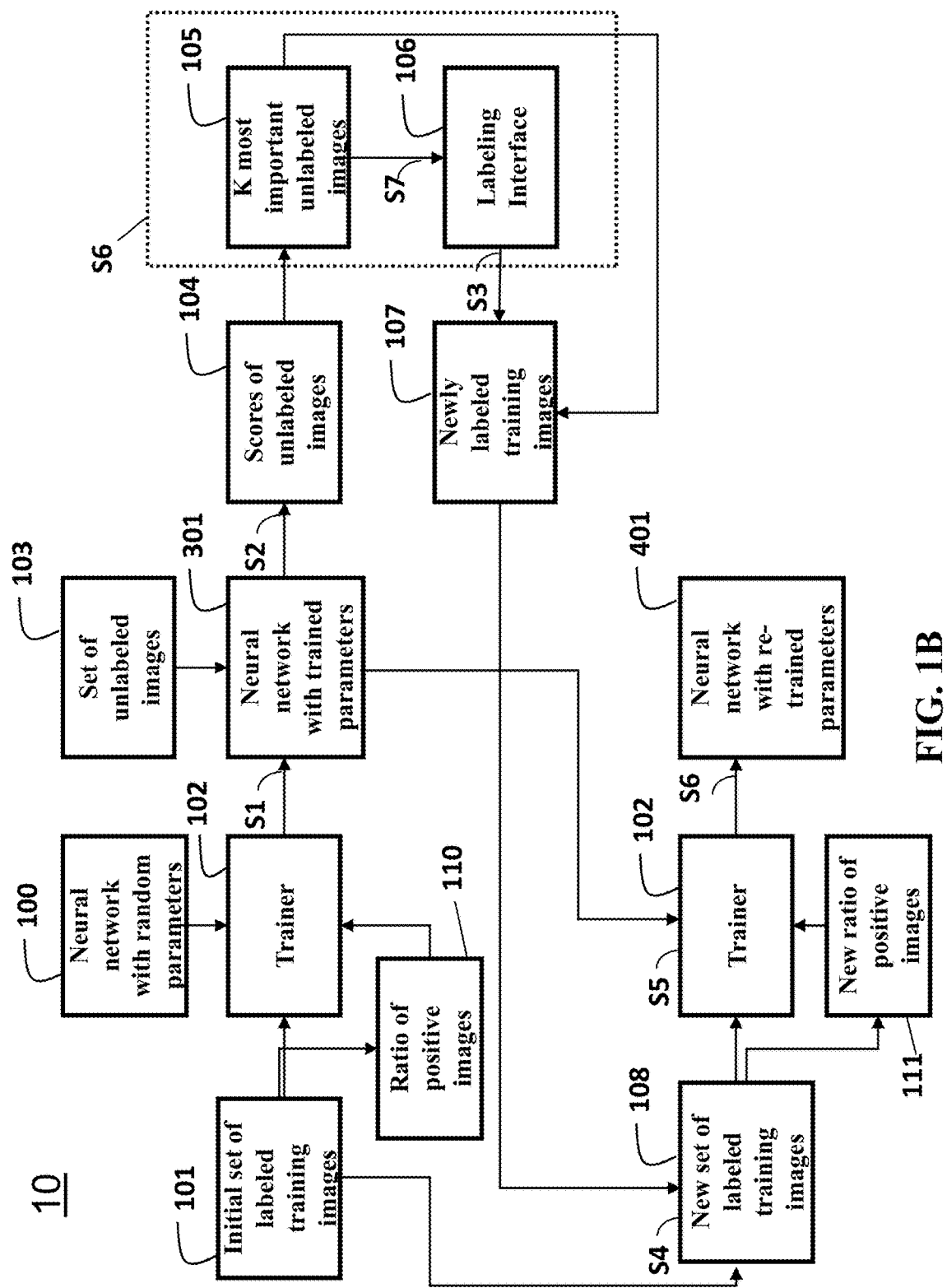
FIG. 1B is a flowchart of an active learning system for training a neural network, in accordance with some embodiments of the present invention.

FIG. 1B shows a basic workflow performed in an active learning system 10 in accordance with some embodiments of the present invention. An initial setting of the active learning system 10 includes a neural network 100 initialized with random parameters, an initial set of labeled training images 101, a trainer 102, a set of unlabeled images 103. In this case, the neural network 100 is a user defined neural network.

The active learning system 10 attempts to efficiently query the unlabeled images for performing annotations through the basic workflow shown in FIG. 1B. Based on the NN 100 with randomly initialized parameters and the ratio 110 of images with positive labels in the labeled training images 101, the trainer 102 updates the network parameters by fitting the NN 100 to the initial labeled training dataset of images 101. As a result, a trained NN 301 with the updated network parameters is obtained in steps S1 and used to rank the importance of images in an unlabeled dataset 103. The unlabeled images 103 are sorted according to importance scores 104 obtained in step S2 from a ranking result performed by the trained NN 301. The K most important images 105 are stored into a labeling storage in a memory (not shown in the figure) associated to a labeling interface 106. In response to data inputs made by an operator (or annotator), the labeling interface 106 generates annotated images 107 having the ground truth labels in step S3. These annotated images 107 are then added to the initial labeled training dataset 101 in step S4 to form a new training dataset 108. The trainer 102 then retrains the network 301 in step S5 by fitting the new training dataset (new set of labeled training images) 108, determines the new ratio 111 of positive images with positive labels in the new training dataset 108, and obtains updated neural network parameters 401 in step S6. This procedure is iterative. The updated neural network parameters 401 are used to rank the importance of the rest of the unlabeled images 103, and the K most important images 105 are sent to the labeling interface 106 in step S7. Usually, this procedure is repeated several times until a predetermined preferred performance is achieved or the budget for annotations is empty.

Figure 3:
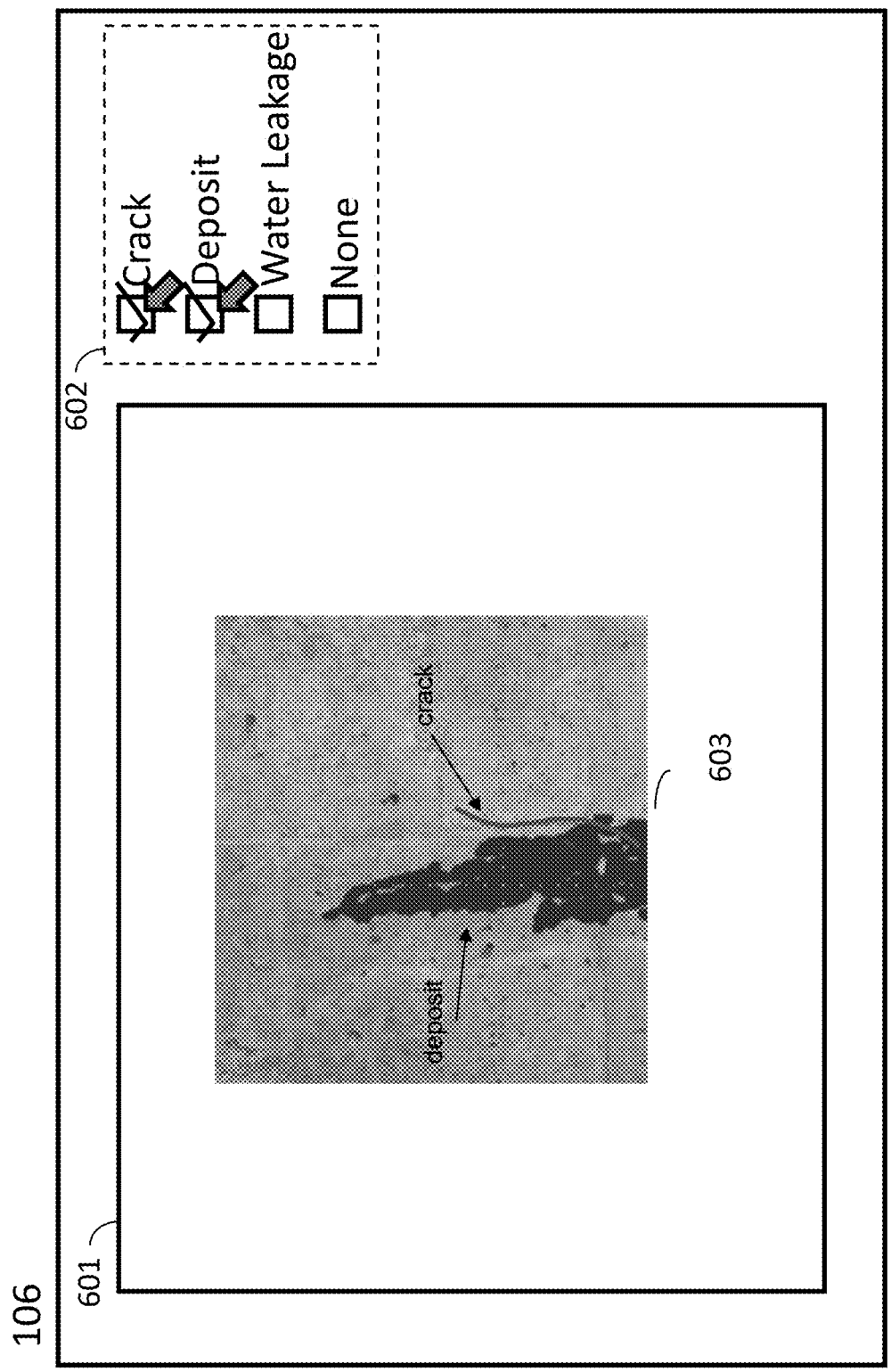
FIG. 3 is an illustration for the labeling interface.

In this case, the active learning system 10, the neural network 100, the trainer 102 and the trained NN 301 may be program modules having computer executable instruction codes. These modules can be stored into one or more memories or a storage device, and executed by the processor when each of the modules is necessary according to the process steps performed in the active learning system 10. Further, the labeling interface 106 may be a graphic user interface (GUI), and an example of the labeling interface 106 is indicated in FIG. 3.

Further, in some embodiments of the invention, a method for training a neural network uses a processor in communication with a memory, and the method includes training a neural network with a dataset including positive and negative images, wherein the positive images are labeled to include a defect of a surface, and wherein the negative images are labeled to not include the defect of the surface; determining an uncertainty measure of an image to include or exclude the defect using the neural network; combining the uncertainty measure with a ratio of the positive or the negative images in the dataset to produce a rank of the image indicative of a necessity of a manual labeling; and adding the labeled image to the dataset thereby updating the ratio and retraining the neural network, wherein steps of the method are performed by a processor.

Further, the training may comprise classifying a training image using the neural network to produce a positive or a negative classification result; detecting when the classification result is different from the label of the training image to produce a positive or a negative classification loss; modifying the classification loss with the ratio or an inverse of the ratio, wherein the inverse of the ratio may be one minus the ratio; and updating weights of neural network based on the modified classification loss.

Figure 1C:
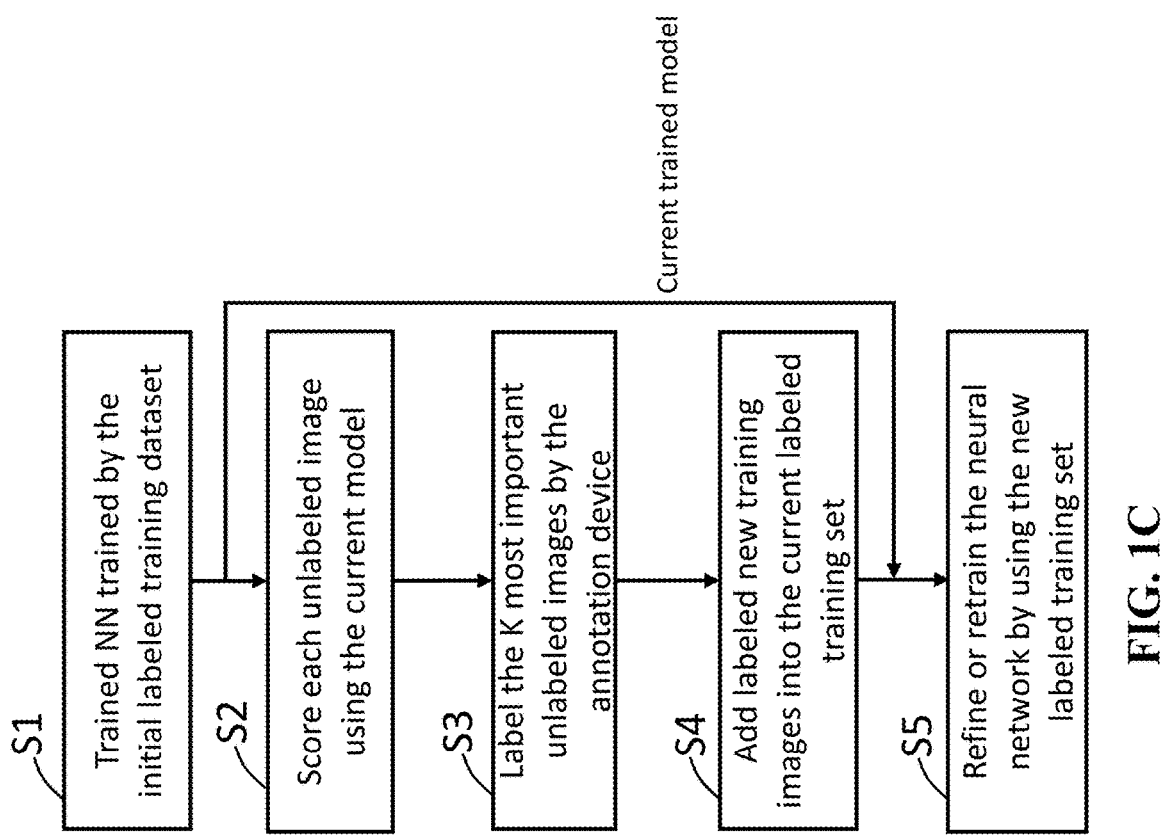
FIG. 1C is a block diagram of process steps to be performed, in accordance with some embodiments of the present invention.

FIG. 1C is a flowchart indicating the basic workflow relevant to the steps S1-S5 in FIG. 1B performed in the active learning system 10 for training neural network.

The active learning system 10 attempts to efficiently query the unlabeled images for the annotation through a process flow shown in the figure. For instance, the process flow includes the following stages:

S1—An initial labeled training dataset is provided and the neural network is trained by using the dataset.

S2—By using the trained NN obtained in step S1, each image in the unlabeled dataset is evaluated and a score would be assigned to each image.

S3—Given the score obtained in step S2, images with the top K highest scores are selected for labeling by the annotation device.

S4—The selected images with newly annotated labels are added into the current (latest) labeled training set to get a new training dataset.

S5—The network is refined or retrained based on the new training dataset.

As shown in FIG. 1C, the active learning algorithms of the active learning system 10 attempt to efficiently query images for labeling images. An initialization model is trained on an initial for small labeled training set. Based on the current model, which is the latest trained model, the active learning system 10 tries to find the most informative unlabeled images to be annotated. A subset of the informative images are labeled and added to the training set for the next round of training. This training process is iteratively performed, and the active learning system 10 carefully adds more labeled images for gradually increasing the accuracy performance of the model on the test dataset. By the very nature, the algorithms of the active learning system 10 usually work much better than the standard approach for training, because the standard approach simply selects the samples at random for labeling.

Although a term "image" is used in the specification, another signal can be used in the active learning system 10. For instance, the active learning system may process other signals, such as RGBD images with both color information and depth information.

Deep Active Learning

With the ResNet-based classifier, our system uses active learning (AL) to reduce the number of images required for annotation and thus reduce the effort and cost of annotation by domain experts.

FIG. 1B illustrates a round of AL. Once an initial classifier is trained with a small set of annotated images, we continue to collect more new images. Other than annotating all images, AL samples a subset of these images for experts to annotate. Once being annotated, these new images are added to the training set to re-train the classifier. Note that the key component of AL is the sampling of new images. Our sampling is based on two strategies, as described below. Both utilize the testing output with the existing classifier, which are probabilities of new image patches containing defects.

Uncertainty-Based Sampling

According to embodiments of the present invention, we have recognitions that one of conventional active learning strategies is based on the uncertainty of the classification result. This can be applied to different learning models like SVMs and GPs. We measure the uncertainty based on the class probabilities y output by the classifier. Given an image patch, if the probability of one class dominates the output, it means that the classifier is very certain about the class of this patch. Otherwise, if multiple classes have similar probability, it means that the classifier is unsure which class to choose, and thus this image patch should be annotated by humans (annotators) for future retraining. For binary classification, the probability function has only two scalars for defect or not. In such a case, we can simply check whether the probability of no defect is close to 0.5. If the probability is close to 0.5, the probability of defect is close to 0.5 as well, implying high uncertainty.

Positive-Based Sampling

An issue of the uncertainty measure is that all classes are treated equally. As the patches with defects (objects of a specific type) are usually much fewer than the defect-free patches, we also revise the uncertainty measurement such that it can focus more on the class of defect, which is the main interest of our system. This simply means that we rank new images with their estimate defect probability from high to low, and send some top ones for expert annotation. Since we are always selecting new patches that the classifier currently believes to be positive, we term this strategy as positive-based sampling.

Figure 1D:
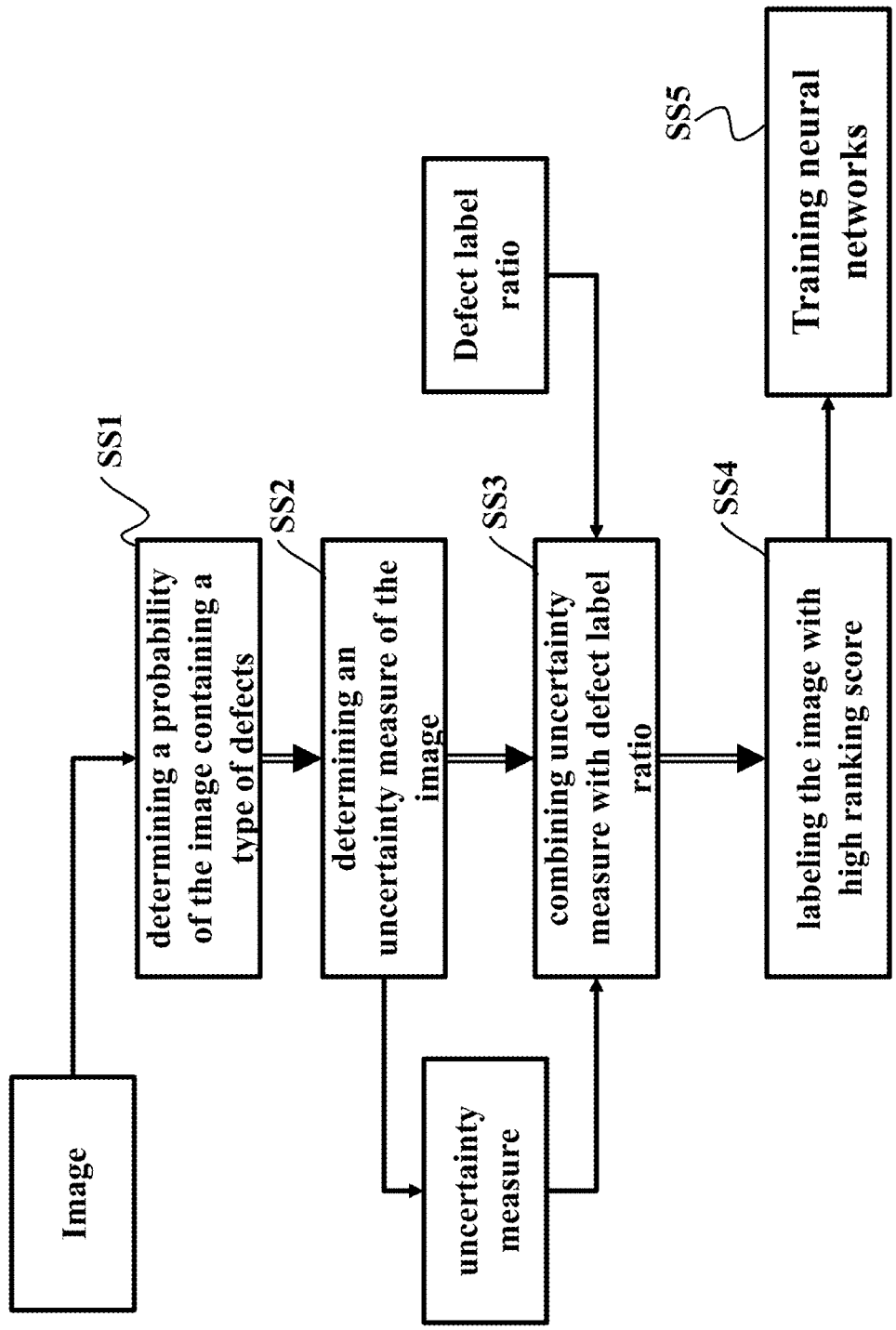
FIG. 1D shows a block diagram indicating an active learning process and a convolutional neural network (CNN) training process, in accordance with some embodiments of the present invention.

FIG. 1D shows a block diagram of process steps to be performed according to some embodiments of the invention. An input image is fed into the active learning system 10, and an initial defect detection NN 100 of the active learning system 10 (can be used as a classifier), determines a probability of the input image containing a type of defects in step SS1 and stores the probabilities into a working memory (not shown). Further, an uncertainty measure is determined from the probabilities indicative of the NN's uncertainty of the input images containing defects in step SS2 and a result of the uncertainty measure is stored in the working memory. The resulting uncertainty measures are combined with a ratio 110 of the images with positive labels indicative of containing defects in the original labeled datasets 101 in step SS3. The combined information is used in step SS4 wherein the input images are labeled according to a ranking score and the labeled images are used in step SS5 for training the NN in the active learning system 10.

Figure 1E:
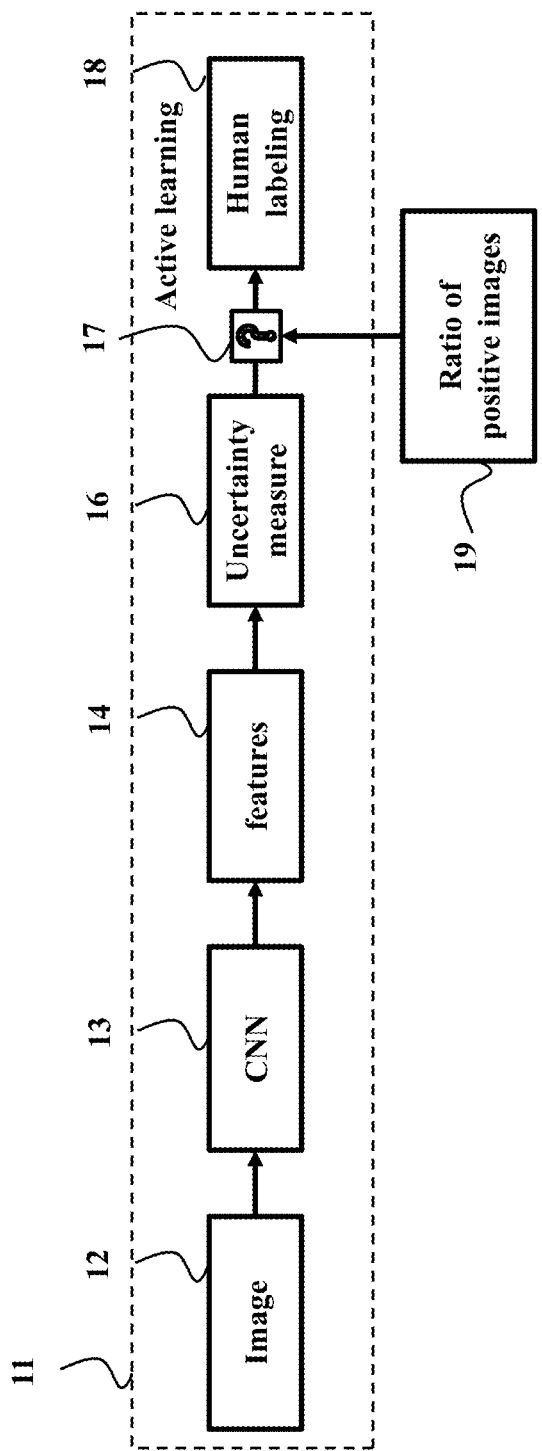
FIG. 1E is a block diagram indicating key process steps performed in an active learning system, in accordance with some embodiments of the present invention.

FIG. 1E shows a block diagram indicating an active learning process 11 performed in the active learning system 10. Upon an identical input image 12, the active learning process 11 performs feeding the input image 12 to a convolutional neural network (CNN) 13, and the CNN 13 extracts features 14 from the input image 12. Further, the active learning process 11 computes an uncertainty measure 16 from the features 14, combines the uncertainty measure 16 with a ratio of the positive images 19 in the labeled datasets, provides a score 17, and ranks the input image 12 by a score 17.

Figure 1F:
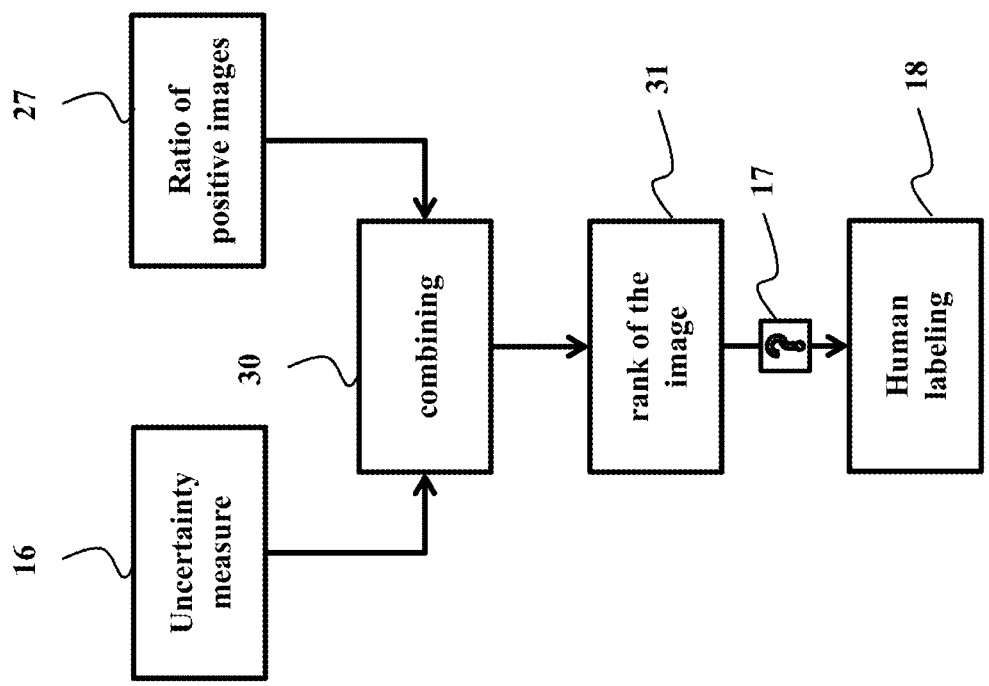
FIG. 1F is a block diagram indicating key process steps performed in an active learning system, in accordance with some embodiments of the present invention.

FIG. 1F is a block diagram indicating key process steps performed in an active learning system, according to some embodiments of the present invention. It is indicated that uncertainty measure 16 and a ratio of positive image 27 is combined in process 30.

When the score 17 is higher than a predetermined threshold, the input image 12 is fed to a labeling interface (e.g. shown in FIG. 3) that allows an operator to annotate the input image 12 according to one of predetermined classified labels. The annotation process is indicated as Human labeling process 18 in the figure. The process steps performed in the active learning process 11 described above are illustrated in FIG. 1B, which shows key process steps performed in the active learning system 10.

In some embodiments of the invention, if the ratio of positive images 27 is close to 0.5, the rank of an unlabeled image 31 is based only on the uncertainty measure 16, which is calculated as the absolute value of 0.5 minus the probability of the image containing defects outputted by the NN 301 in step SS1. This is termed as the "uncertainty based sampling" for active learning. If the ratio of positive images 27 is lower than a predefined threshold, the rank of an unlabeled image is based on the probability of the image containing defects outputted by the NN 301 in step SS1. This is termed as the "positive based sampling" for active learning.

Figure 2:
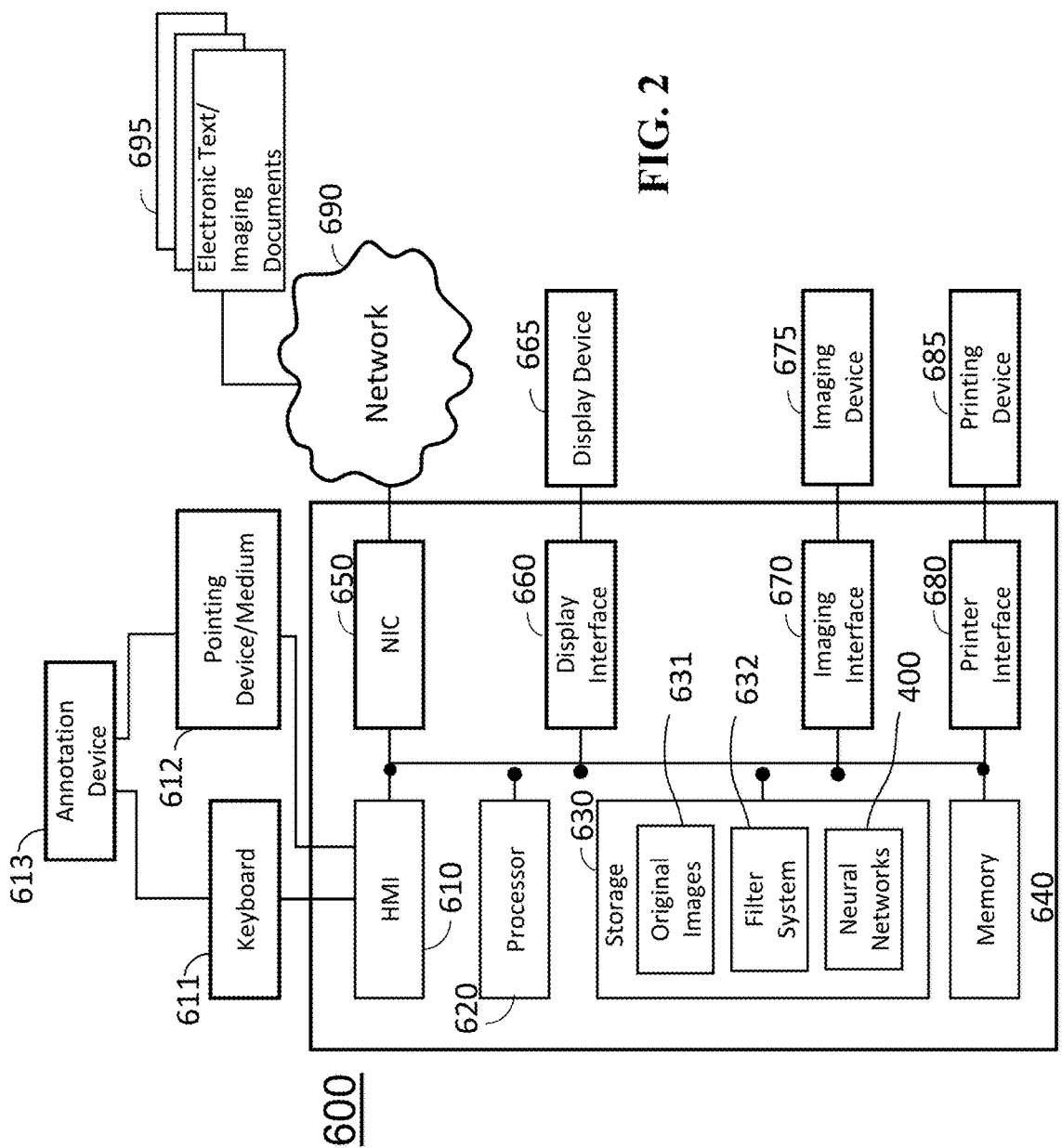
FIG. 2 is a block diagram of an active learning system for annotating the unlabeled images in accordance with some embodiments of the present invention.

FIG. 2 shows a block diagram of an active learning system 600 according to some embodiments of the invention. The active learning system 600 includes a human machine interface (HMI) 610 connectable with a keyboard 611 and a pointing device/medium 612, a processor 620, a storage device 630, a memory 640, a network interface controller 650 (NIC) connectable with a network 690 including local area networks and internet network, a display interface 660, an imaging interface 670 connectable with an imaging device 675, a printer interface 680 connectable with a printing device 685. The processor 620 may include one or more than one central processing unit (CPU). The active learning system 600 can receive electric text/imaging documents 695 via the network 690 connected to the NIC 650. The active learning system 600 can receive annotation data from the annotation device 613 via the HMI 610. Further, the annotation device 613 includes a display screen, and the display screen of the annotation device 613 is configured to display the labeling interface 106 (e.g. in FIG. 3) that allows the operator to perform labeling process of unlabeled images stored in the memory 640 by showing the unlabeled image in the display region 601 with the selection area 602 having predetermined annotation boxes and predetermined labeling candidates to be selected.

The storage device 630 includes original images 631, a filter system module 632, and a neural network 400. For instance, the processor 620 loads the code of the neural network 400 in the storage 630 to the memory 640 and executes the instructions of the code for implementing the active learning. Further, the pointing device/medium 612 may include modules that read programs stored on a computer readable recording medium.

FIG. 3 shows an example of the labeling interface (graphical user interface: GUI) 106 according to some embodiments of the invention. The labeling interface 106 includes a display region 601 and a selection area 602. The labeling interface 106 can be installed in the annotation device 613, which indicates the labeling interface 106 on a display of the annotation device 613. In some cases, the labeling interface 106 can be installed an input/output interface (not shown in the figure) connectable to the human machine interface (HMI) 610 via the network 690. When the labeling interface 106 receives an unlabeled image of the K most important unlabeled images 105 in step S6 of FIG. 1B, the labeling interface 106 shows the unlabeled image on the display region 601. The selection area 602 indicates predetermined candidates for labeling the unlabeled image shown on the display region 601. The labeling interface 106 allows an operator to assign one of selectable annotations indicated in the selection area 602 with respect to the unlabeled image shown in the display region 601. In FIG. 3, the selection area 602 provides selection boxes with predetermined labeling candidates: Crack, Deposit, Water Leakage, and None. As an example, FIG. 3 shows an unlabeled image indicating an image 603 containing deposits and crack, types of surface defects, displayed in the display region 601. In this case, the annotation boxes of Crack and Deposit are checked by the operator (annotator) in response to the image shown in the selection area 602. The labeling interface 106 is configured to load and show unlabeled images stored the labeling storage in the memory according to the operations by the operator. The images labeled by the labeling interface 106 are stored into a new training image storage area in the memory in step S3 as newly labeled training images 107 as seen in FIG. 1B.

Detect Defection and Classification

In some embodiments according to the present disclosure, given an input image x, the neural network (NN) with weights $\Theta$ will output the probabilities that this image is a defect or not, which is $y:=[y_0, y_1]\in[0,1]^2$. This output of the network is a non-linear mapping $y=f_\Theta(x)$, where $y_1$ models the probability of x containing a defect, and $y_0=1-y_1$ models the probability of x containing no defects. During training, x is randomly cropped from a 520×520 patch as a means of data augmentation to enhance the network's invariance to in-plane translation. During testing, x is always cropped from the center of a 520×520 patch.

Loss Function

More specifically, for a mini-batch of N images, the commonly used cross-entropy loss is defined as:

$$E = \frac{-1}{N} \sum_{n=1}^{N} \log(y_{n,l_n}),$$

where $l_n$ is the binary label (defect or non-defect) of the n-th patch, $y_{n,l_n}$ is the predicted probability of being a defect if the label $l_n$ is defect, and vice versa. Since the number of non-defect images is often much more than defect images in a typical dataset, a weighted cross-entropy loss is proposed to deal with this skewness. Otherwise if a model is trained by the original cross-entropy loss, it will be biased by the large amount of non-defect samples. Therefore, some embodiments of the invention weight non-defect images more in the loss function. The weighted cross-entropy loss is defined as:

$$E = \frac{-1}{N} \sum_{n=1}^{N} w(l_n) \log(y_{n,l_n}),$$

where $w(l_n)$ is the weight of each patch, which is decided by its label. For a defect patch, the weight $w(l_n)$ is the portion of non-defect images in the training set; for a non-defect patch, the weight is the portion of defect images.

Residual Network (Deep ResNet)

It is our recognition that stacking more layers directly does not give us a better CNN. A deeper network may face the degradation problem, which makes its performance worse than a shallow one. ResNet eases the difficulty of training a deeper network by using the mapping with a residual unit to replace the original mapping in the network. According to embodiments of the present invention, we apply the ResNet to general defect detection is proposed.

FIG. 4 shows an example of an architecture of a neural network for detecting defects, according some embodiments of the present disclosure. In this case, the neural network can be a binary classifier. It should be noted that batch normalization is used after each convolutional layer (stride 1 if not specified) in the network. In this case, down-sampling is performed by conv2_1 and conv3_1 with a stride of 2.

Data Preparation

As an example, we prepared sample datasets to evaluate implementation results of embodiments of the present invention. Our data set contains 603 raw images with 4096×4800 pixels. These images are annotated in pixel level to indicate whether a pixel is defect free or belong to the following defect types: cracks, deposit, and water leakage (not shown). In this case, a pixel can belong to more than one type of crack types. The annotation was done by domain experts. To train and evaluate our classifier, we split the images into three sets: 60% for training, 20% for validation, and 20% for testing. During the training, the training and validation accuracies were regularly reported so we can evaluate whether the training start to overfit the training data.

To augment our dataset, we split each raw image into patches. Each patch has 520×520 pixels, to contain enough context for our ResNet to make accurate decisions. The patches are split using a sliding window manner starting from the top left corner of the images, with a step size of 214/149 along the row/column direction respectively. Thus, the 603 raw images are transformed into 289440 patches with 22.6% positive cases. We assign each patch a positive label if its centering 480×480 region contains at least one defect pixel. Otherwise the patch is considered as defect free with a negative label. These patches and their binary labels are used for the following training and testing of defect classifiers. Rough detection as it seems, such patch-wise results are already useful to warn inspectors the existence of defects in a very small region. In the future, we could look into denser pixel-wise defect detection.

Training Networks

We perform training of the network with 4 NVIDIA TITAN×GPU in standard Caffe using a stochastic gradient descent solver with the following hyper-parameters. Each of parameters are effective mini-batch size of 480; max iteration of 60 epochs (1 epoch iterates through the whole dataset for once); learning rate of 0.1 with a decreasing factor of 10 after 50% and 75% max iterations; momentum of 0.9; weight decay of $10^{-4}$. The training is performed on the training set and the trained weights with the highest validation accuracy across all iterations are adopted finally for testing.

Figure 5A:
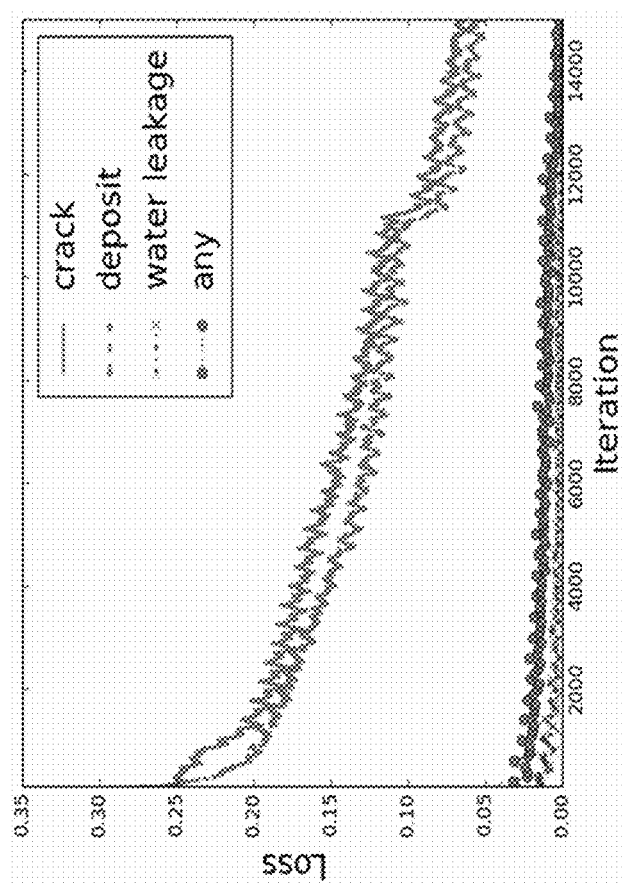
FIG. 5A shows training losses of the network, in accordance with some embodiments of the present invention.

FIG. 5A shows training losses of the network. In this case, we trained four classifiers with the same network architecture focusing on four types: "crack", "deposit", "water leakage", and "any" (meaning the presence of any of the previous three defects in an input image patch).

Figures 5B, 5C:
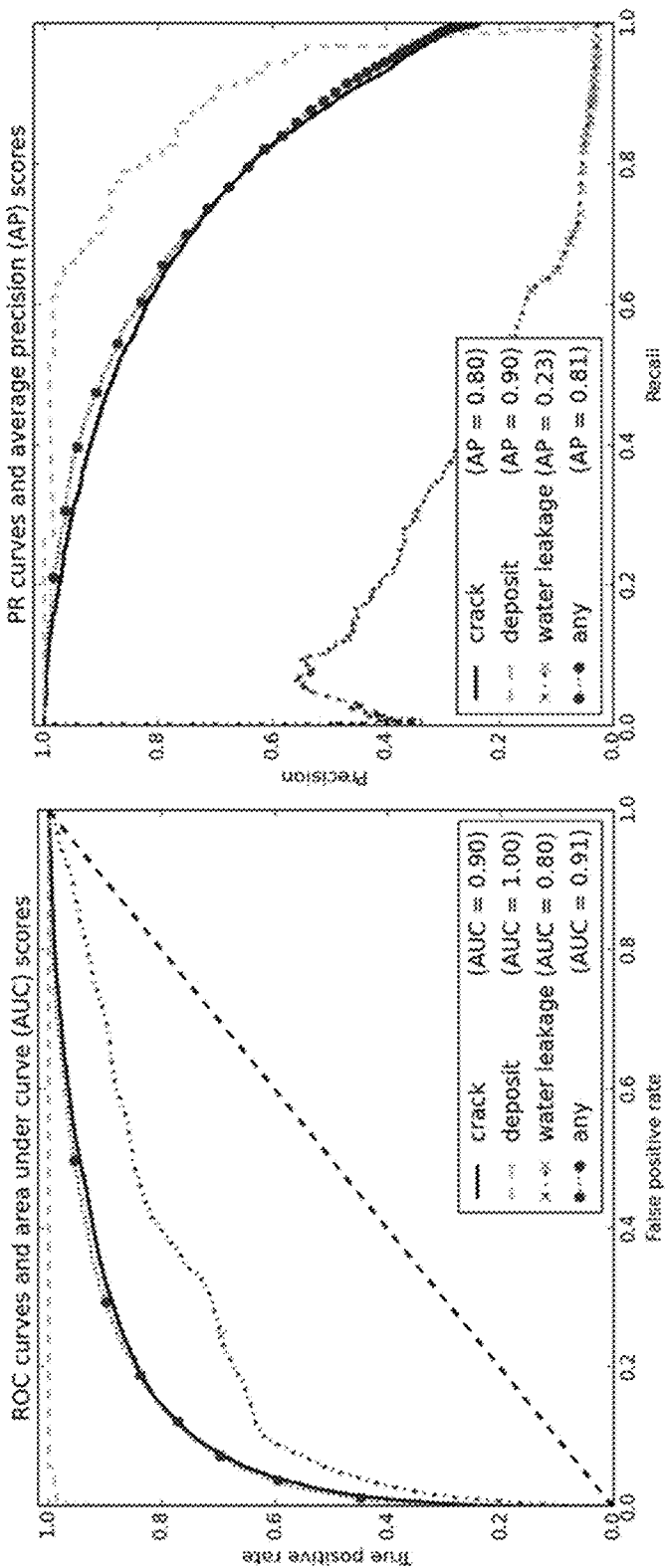
FIGS. 5B and 5C are testing results for a receiver operating characteristic curve and a precision-recall curve, in accordance with some embodiments of the present invention.

FIGS. 5B and 5C are testing results for a receiver operating characteristic curve and a precision-recall curve. For instance, using $y_1 \geq 0.5$ to decide a patch being positive (i.e., has defect), during testing we obtain a true-positive-rate of 15.7%, true-negative-rate of 71.8%, false-positive-rate of 4.1%, false-negative-rate of 8.4%, meaning a precision of 79.5%, and recall of 65.0%.

Figures 6A, 6B:
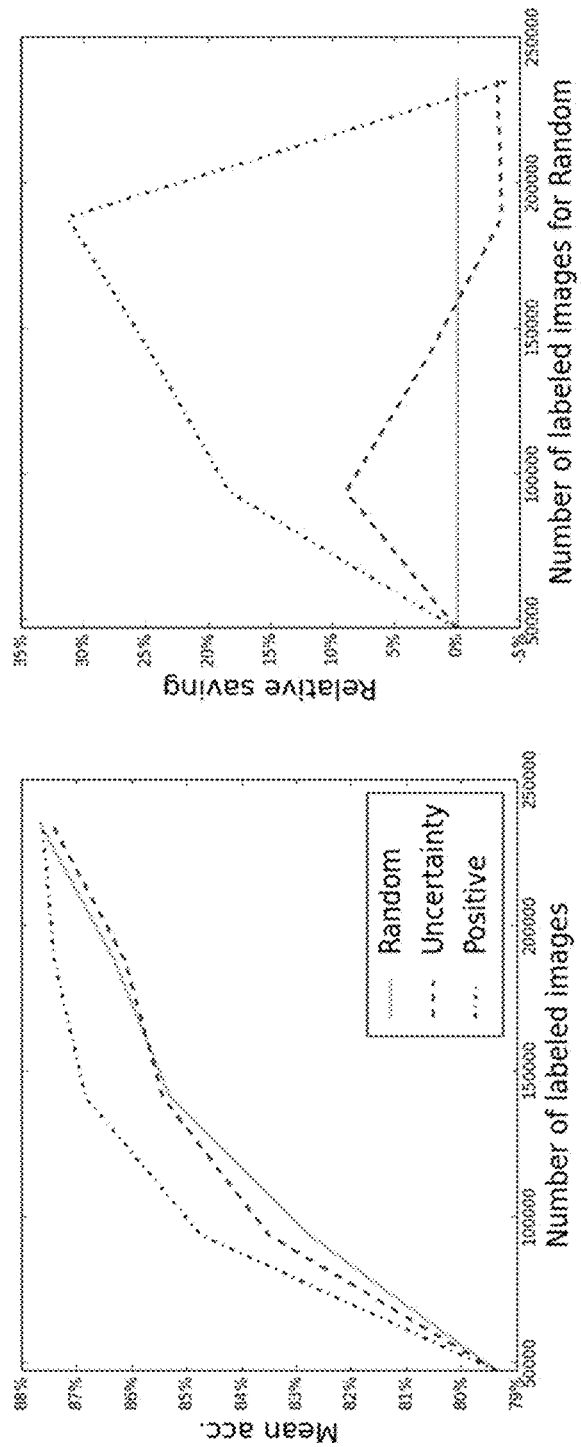
FIG. 6A shows the testing accuracy (y-axis) of resulting network at each cycle (x-axis), in accordance with some embodiments of the present invention.
FIG. 6B shows the relative saving of labeled images for achieving the same testing accuracy, in accordance with some embodiments of the present invention.

FIG. 6A shows the testing accuracy (y-axis) of resulting network at each cycle (x-axis), in accordance with some embodiments of the present invention. FIG. 6B shows the relative saving of labeled images for achieving the same testing accuracy as random sampling. It is clearly indicated that positive sampling is better and saves about 30% labeled images to achieve the same testing accuracy of about 87.5%.

For comparison, we also tested our data with SVM. We incrementally train the SVM batch by batch, due to CPU memory limitations in face of the large training set. The batch size is empirically specified as 1000. Our SVM was trained with the stochastic gradient descent solver of scikit-learn in Python. Note that this SVM implementation also supports the weighting of classes (similar to the above weighted loss function). The accuracy with or without class weighting is 74.6% and 75.4% respectively. One can see our ResNet performs much better than SVM in this case as expected, since no feature engineering is performed before SVM. This supports our reasoning in the introduction, and clearly demonstrates the power of CNN.

In our AL experiments, it follows the same implementation details as mentioned above, except that we train 40 epochs to save computation time. In these experiments, we combined the training and validation set (type: "any") together for training (235200 patches). To simulate the actual AL process, we start with only ⅕ of training data (47040 patches), and perform 4 cycle of AL. In each cycle, 47040 patches are firstly sampled from the data unknown to the classifier yet, and then added for retraining. We compare the uncertainty-based and positive-based sampling with random sampling. The left image in FIG. 6A shows the testing accuracy (y-axis) of resulting network at each cycle (x-axis). FIG. 6B shows the relative saving of labeled images for achieving the same testing accuracy as random sampling. Clearly, positive sampling is better and saves about 30% labeled images to achieve the same testing accuracy of about 87.5%.

As discussed above, the artificial neural network according to some embodiments of the invention can provide less annotation processes with improving the classification accuracy, the use of artificial neural network that determines an uncertainty measure may reduce central processing unit (CPU) usage, power consumption, and/or network bandwidth usage, which is advantageous for improving the functioning of a computer.

The current invention involves an active learning algorithm for classification and labeling of images of civil infrastructure surfaces, to increase the efficiency and performance of automatic defect detection process.

The active learning algorithm used in the image processing system according to embodiments of the present disclosure is useful in reducing the amount of annotated data required for accurate defect detection and is also less time consuming, which increases the efficiency of computing power, reducing the power consumption of computers. This can be outstanding beneficial effect. Active learning operates on the premise that a learning system's performance can be incrementally increased by gathering labeled images over time and retraining the system based on incrementally gathered data.

Further, according to an embodiment of the present disclosure, a non-transitory computer readable storage medium storing a classifier based on an active learning algorithm and a set of labeled images for training the classifier can be operable by executing the active learning algorithm using a process included in an image processing system. In some cases, the active learning algorithm may be referred to as an active learning method.

In some cases, a non-transitory computer readable storage medium storing a classifier and a set of labeled images for training the classifier, each labeled image is labeled as either a positive image that includes an object of a specific type or a negative image that does not include the object of the specific type, wherein the set of labeled images has a first ratio of the positive images to the negative image and embodied thereon a program executable by a processor for performing a method. The method may include receiving a set of input images; determining, based on the first ratio, a second ratio of the positive images to the negative images; classifying, using the classifier, the input images into positive and negative images to produce a set of classified images; selecting a subset of the classified images having the second ratio of the positive images to the negative images; and rendering the subset of the input images for labeling.

Further, for instance, a method for image processing, wherein the method uses a processor coupled to a memory storing a classifier and a set of labeled images for training the classifier, each labeled image is labeled as either a positive image that includes an object of a specific type or a negative image that does not include the object of the specific type, wherein the set of labeled images has a first ratio of the positive images to the negative images, wherein the processor is coupled with stored instructions implementing the method, wherein the instructions, when executed by the processor carry out at least some steps of the method, the method includes receiving a set of input images; determining, based on the first ratio, a second ratio of the positive images to the negative images; classifying, using the classifier, the input images into positive and negative images to produce a set of classified images; selecting a subset of the classified images having the second ratio of the positive images to the negative images; and rendering the subset of the input images for labeling.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Also, the various methods or processes outlined herein may be coded as software that is executable on one or more processors that employ any one of a variety of operating systems or platforms. Alternatively, or additionally, the invention may be embodied as a computer readable medium other than a computer-readable storage medium, such as signals.

The terms "program" or "software" are used herein in a generic sense to refer to any type of computer code or set of computer-executable instructions that can be employed to program a computer or other processor to implement various aspects of the present invention as discussed above.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although several preferred embodiments have been shown and described, it would be apparent to those skilled in the art that many changes and modifications may be made thereunto without the departing from the scope of the invention, which is defined by the following claims and their equivalents.

We claim:

1. An image processing system, comprising:
a memory to store a classifier and a set of labeled images for training the classifier, each labeled image is labeled as either a positive image that includes an object of a specific type or a negative image that does not include the object of the specific type, wherein the set of labeled images has a first ratio of the positive images to the negative images;
an input interface to receive a set of input images;
a processor to determine, based on the first ratio, a second ratio of the positive images to the negative images, to classify, using the classifier, the input images into positive and negative images to produce a set of classified images, and to select a subset of the classified images having the second ratio of the positive images to the negative images, wherein the processor determines an uncertainty measure for each classified image indicating a confidence of the classifier that the classified image is the positive image or the negative image, orders the classified images according an order of their uncertainty measures into a sequence of positive images and a sequence of negative images, and selects a predetermined number of consecutive images from the sequence of positive images and a predetermined number of consecutive images from the sequence of negative images to satisfy the second ratio; and an output interface to render the subset of the input images for labeling.

2. The image processing system of claim 1, wherein the output interface is a display device having an interface allowing an operator to label a displayed image as the positive image or the negative image, wherein the processor renders the subset of the classified images on the display device, adds, in response to labeling the subset of classified images by the operator, the subset of the labeled classified images into the set of labeled images thereby updating the first ratio, and retrains the classifier with the updated set of labeled images.

3. The image processing system of claim 2, wherein the processor trains the classifier using a weighted loss function penalizing incorrect positive and negative classification differently, wherein the weights of the weighted loss function are based on at least one or a combination of the first ratio and the second ratio.

4. The image processing system of claim 1, wherein the object of the specific type is one or combination of a deposit of a surface, a crack of the surface, and effects of a water leakage of the surface.

5. The image processing system of claim 1, wherein the labeled images and the input images include one or combination of intensity images and depth images.

6. The image processing system of claim 1, wherein the classifier is a binary classifier.

7. The image processing system of claim 1, wherein the classifier is a multi-label classifier, wherein the images are classified independently for each label.

8. The image processing system of claim 1, wherein the classifier is a convolutional neural network.

9. The image processing system of claim 8, wherein the convolutional neural network is a residual neural network.

10. The image processing system of claim 1, wherein the second ratio is an inverse of the first ratio.

11. The image processing system of claim 1, wherein the second ratio equals one when the first ratio is less than a threshold.

12. The image processing system of claim 1, wherein the second ratio equals zero when the first ratio is greater than a threshold, and wherein an inverse of the second ratio equals zero when an inverse of the first ratio is less than a threshold.

13. A method for image processing, wherein the method uses a processor coupled to a memory storing a classifier and a set of labeled images for training the classifier, each labeled image is labeled as either a positive image that includes an object of a specific type or a negative image that does not include the object of the specific type, wherein the set of labeled images has a first ratio of the positive images to the negative images, wherein the processor is coupled with stored instructions implementing the method, wherein the instructions, when executed by the processor carry out at least some steps of the method, comprising:

receiving a set of input images;

determining, based on the first ratio, a second ratio of the positive images to the negative images;

determining an uncertainty measure for each classified image indicating a confidence of the classifier that the classified image is the positive image or the negative image;

ordering the classified images according an order of their uncertainty measures into a sequence of positive images and a sequence of negative images; and selecting a predetermined number of consecutive images from the sequence of positive images and a predetermined number of consecutive images from the sequence of negative images to satisfy the second ratio;

classifying, using the classifier, the input images into positive and negative images to produce a set of classified images;

selecting a subset of the classified images having the second ratio of the positive images to the negative images; and rendering the subset of the input images for labeling.

14. The method of claim 13, further comprising:

adding, in response to labeling the subset of classified images, the subset of the labeled classified images into the set of labeled images thereby updating the first ratio; and retraining the classifier with the updated set of labeled images.

15. The method of claim 14, further comprising:

training the classifier using a weighted loss function penalizing incorrect positive and negative classification differently, wherein the weights of the weighted loss function are based on at least one or a combination of the first ratio and the second ratio.

16. The method of claim 13, wherein the second ratio is an inverse of the first ratio.

17. The method of claim 13, wherein the second ratio equals zero when the first ratio is greater than a threshold, and wherein an inverse of the second ratio equals zero when an inverse of the first ratio is less than a threshold.

18. A non-transitory computer readable storage medium storing a classifier and a set of labeled images for training the classifier, each labeled image is labeled as either a positive image that includes an object of a specific type or a negative image that does not include the object of the specific type, wherein the set of labeled images has a first ratio of the positive images to the negative image and embodied thereon a program executable by a processor for performing a method, the method comprising:

receiving a set of input images;

determining, based on the first ratio, a second ratio of the positive images to the negative images;

determining an uncertainty measure for each classified image indicating a confidence of the classifier that the classified image is the positive image or the negative image;

ordering the classified images according an order of their uncertainty measures into a sequence of positive images and a sequence of negative images; and selecting a predetermined number of consecutive images from the sequence of positive images and a predetermined number of consecutive images from the sequence of negative images to satisfy the second ratio;

classifying, using the classifier, the input images into positive and negative images to produce a set of classified images;

selecting a subset of the classified images having the second ratio of the positive images to the negative images; and rendering the subset of the input images for labeling.

* * * * *